April 6, 1954  L. J. BEHR  2,674,417
PROTECTOR AND CUTOFF FOR ADHESIVE TAPES
Filed Jan. 17, 1952
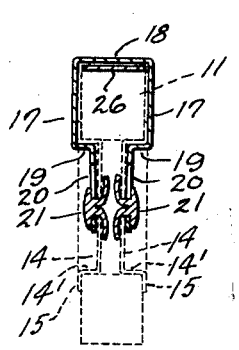
Fig.2.
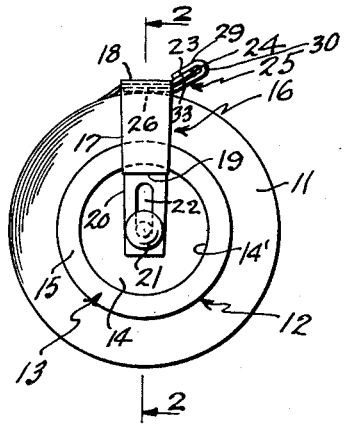
Fig.1.
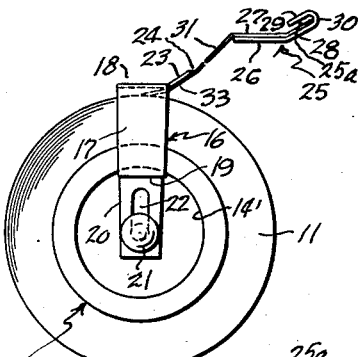
Fig.3.
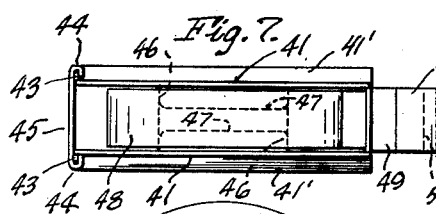
Fig.7.
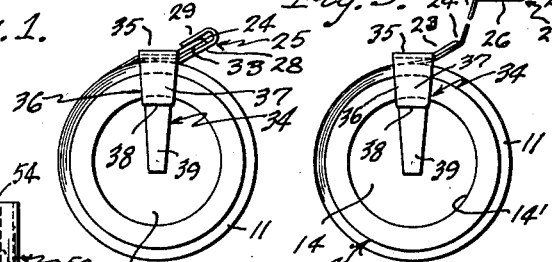
Fig.4. Fig.5.
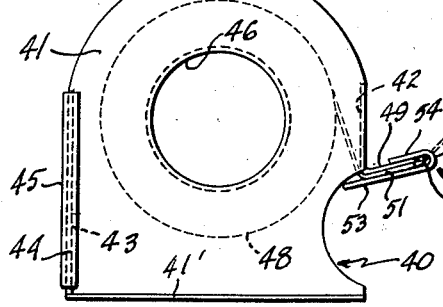
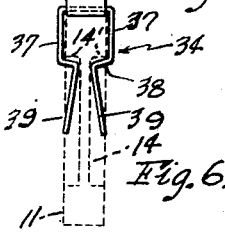
Fig.6.
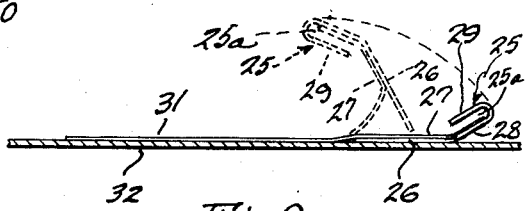
Fig.9.
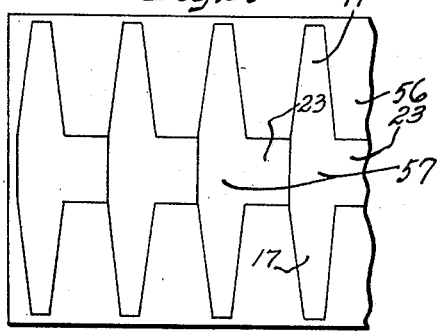
Fig.8.
Fig.10.
Inventor
Leo Joseph Behr
Attorneys Patented Apr. 6, 1954

2,674,417

UNITED STATES PATENT OFFICE 2,674,417

PROTECTOR AND CUTOFF FOR ADHESIVE TAPES

Leo Joseph Behr, Bridgeport, Conn.

Application January 17, 1952, Serial No. 266,871

7 Claims. (Cl. 242—55.5)

This invention relates to a protector and cut-off for adhesive tapes, particularly of the type in which one side of the tape is coated with a so-called nondrying adhesive, which either does not dry after the tape has been applied, or at least dries very slowly, and also dries very slowly when exposed to the air, such, for example, as medical tape, electrical tape, transparent tape, masking tape, florists' tape, so-called "Scotch tape," mending tape, and the like, and has for an object to facilitate removing a desired length of the tape from the roll or coil and applying it to the object on which it is to be used. The adhesives for these tapes are sometimes known as pressure sensitive coatings, as when applying the tapes to another article they are merely pressed against the article to cause the coating to make the tape adhere to it.

It is also an object to provide such a device in which the adhesive side of the tape is covered and protected against drying out or collecting dust and dirt, or its surface being marred prior to its removal from the coil to be applied.

It is another object to provide such a device in which the tape is not exposed to the air to dry out prior to use, and it is not necessary for the operator to grip the free ends of the tape with the fingers, for the fingers thus to become soiled or the sticking value of the tape to be decreased, or in the case of transparent tape to decrease its transparency.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 1 is a side elevation of a roll or coil of tape showing one form of my improved protector and cut-off applied thereto;

Fig. 2 is a transverse section substantially on line 2—2 of Fig. 1, but showing the roll or coil of tape in dotted lines;

Fig. 3 is a side view showing the operation of withdrawing a length of tape from the coil;

Fig. 4 is a side view similar to Fig. 1 showing a somewhat modified construction;

Fig. 5 is a side view similar to Fig. 4 showing how a length of tape is withdrawn from the roll or coil;

Fig. 6 is an edge view looking from the right of Fig. 4 showing the coil of tape in dotted lines;

Fig. 7 is a top plan view of a modified construction;

Fig. 8 is a side view of the device of Fig. 7;

Fig. 9 is a partial section and partial side elevation showing the application of a removed length of the tape to an article, and Fig. 10 is a plan view of a strip of metal or similar material showing how the device of Figs. 1 to 6 may be blanked from it.

Referring first to Figs. 1 to 3, a coil or roll of the adhesive tape of any standard diameter or width is shown at 11, wound on a suitable central support 12, in this case comprising a pair of side plates 13 depressed in the center at 14, leaving peripheral offsets 14' at the inner side of flanges 15 on which the coil of tape 11 is wound. My protector and cut-off device is indicated as a whole at 16 and preferably comprises a strip of flat sheet metal bent to substantially U-shape so as to embrace side portions of the coil of tape and held thereon in the positions shown in Figs. 1, 2 and 3. That is, the legs of the device include a portion 17 closely adjacent the opposite sides of the coil 11 connected by a transverse portion 18 extending over and across the outer edge of the coil, and then at an intermediate point the legs 17 are offset inwardly as shown at 19 under the offset 14' of the center support 12, and then the free end portions 20 lying on opposite sides of the depressed portion 14 of the tape holder and secured thereto by any suitable means, such, for example, as a rivet or rivets 21, passing through the portions 20 and the sides 14 of the holder to form a pivotal connection so that the connector 16 may move around the periphery of the coil 11, or the coil may rotate within this protector, as a strip of the tape is withdrawn from the coil. The leg portions 20 are also preferably provided with an elongated slot 22 extending longitudinally of these legs, that is, radially of the coil 11, so that as the tape is removed from the coil and its diameter diminishes the protector 16 may move radially inwardly to maintain the cross portion 18 closely adjacent the outer surface of the coil. At one edge of this connecting portion 18 is a rearwardly extending and upwardly inclined extension 23 provided with a knife edge 24 at its free edge. This edge is for cutting off a desired length of tape, and may be either a straight knife edge or a serrated edge, as found desirable.

Associated with the member 16 is a protector and finger grip 25 for the free end of the tape. This comprises a strip of sheet metal including a base portion 26 to lie under and support a free end portion 27 of the tape, and as the portion 26 is on the under or inner side of the tape it is on the adhesive side so that the free end portion 27 of the tape is held to the base portion 26 of the holder and grip by the adhesive. This holding grip 25 also includes an upwardly inclined intermediate portion 28, and at its outer end a reversely bent portion 29 spaced outwardly and upwardly from the portion 28 and substantially parallel thereto, and forming with the base portion an enclosed space or recess 25a. In the normal position of the device, as shown in Fig. 1, the free end 27 of the tape lies on the under side of the transverse wall 18 and the inclined extension 23, and the grip member 25 lies under these portions with the free end portion 27 lying on top of the base portion 26 and the inclined portion 28. In this position the base portion 26 is under the transverse wall 18, the intermediate inclined portion 28 is on the under side of the extension 23, and the reversely bent portion 29 is on top of the extension 23, with the knife edge 24 lying within the loop 30 connecting the portions 28 and 29, or that is, within the enclosed space or recess 25a. It will be seen that in this position the grip and protector 25 is held and retained in this position by the tape with its free end portion 27 adhering to the surface of the grip and protector 25, and also that all adhesive surfaces of the tape are thus covered and protected against drying out or gathering of dust and dirt, or other injury.

If it is now desired to remove any given length of tape, indicated at 31, from the roll or coil 11, the operator grips the exposed portions 28 and 29 of the grip and protector 25 and draws it outwardly away from the member 16. As the free end portion 27 of the tape is pressed against this grip and protector and is held to it by its adhesive coating, this tape will follow along with the grip member, uncoiling a strip 31 from the coil 11, it being understood that the member 16 is held in the other hand of the operator and the coil 11 rotates within it as the strip of tape is withdrawn. As this strip or length 31 is withdrawn it passes outwardly under the inclined extension 23, and after the desired length has been withdrawn, all that is necessary is for the operator to tear it off against the knife edge 24 which is located closely at the top surface of the strip, as is shown in Fig. 3. In the pulling off operation, if the free end of the tape tends to separate from the grip 25 it may be more firmly held by the operator placing a thumb or finger on top of the end portion 27 and pressing it against the surface of the member 25.

It will now be apparent that a cut off length or strip 31 of the tape is free from the coil 11, but adhering at its outer end to the grip and protector 25. In applying this strip to the article to be taped, which is indicated by way of example as a flat member 32 in Fig. 9, the free portion 31 of the strip may be applied to the surface of this member with the adhesive coated side down or against the article to be taped, by manipulation through the member 25, which is held between a thumb and finger of the user. Then by merely lifting this grip member to the dotted line position it may be easily withdrawn from the end of the tape by shifting it to the right and releasing, the free end of the tape being then pressed down against the surface of the member to be taped. The member 25 therefore functions not only as a grip and protector for the tape, but also as an applicator for it. It will be understood that in this operation the adhesive surface of the tape does not come in contact with the fingers of the user at any time, but that it is always protected by the member 25, which not only forms a means for gripping the tape and applying it to any surface or location desired, but also protects the adhesive surface of the tape. Therefore the fingers are not soiled, nor is the sticking value of the tape in any way reduced, nor is the adhesive surface marred or injured in any way. After removal of the member 25 from the applied tape, it is again inserted under the free end portion 33 of the coil lying under the extension 23 of the wall 18 to the position of Fig. 1, and pressed against the under or adhesive side of the tape, so that it is now in position for removing another strip of the tape for use, and also covers the knife edge 24 so that in normal handling of the roll or coil of tape the operator is protected from injury from this knife edge.

In Figs. 4, 5 and 6 there is shown a slight modification, but the fundamental form of the device is the same and operates in the same manner as shown in Figs. 1 to 3. In this case, the protector member 34 corresponding to the member 16 is of U-shape to embrace the coil 11 of the tape and has a connecting end portion 35 corresponding to the wall 18 of the first form. The legs 36 include portions 37 corresponding to the portions 17 of the first form lying at the sides of the coil 11, and they are offset at an intermediate point 38 corresponding to the offset 19 in the first form. The free end portions 39, however, are not riveted to the center 14, but are left free and with the side portions 37 form spring fingers resiliently gripping the sides of the center support 12, and the offsets 38 lying under the offsets 14' of the center piece retain the member in position on the coil and permit it to slide around the coil, or that is, the coil to turn in this member the same as in the first form when it is held in one hand of the operator, and the free strip 31 of the tape is withdrawn from the coil. The side members or legs 36 thus in effect pivotally secure the protector member 34' to the coil of tape. Transverse wall 35 is provided with the rearwardly and upwardly inclined extension 23 provided with the knife edge 24 the same as in the first form, and this is used with the same grip and protector 25 and functions in exactly the same way in withdrawing a strip of tape 31 and cutting it off as in the first form. After applying the removed strip of tape the grip and protector 25 is returned to the position shown in Fig. 4, which is the same and corresponds exactly with the arrangement shown in Fig. 1.

Figs. 7 and 8 show how the device may be applied to a housing enclosing a roll or coil of the adhesive tape. In this case a housing 40 is shown comprising a pair of sheet metal side members 41 connected at the front by a cross wall 42. At the rear each side is provided with an outwardly turned flange 43, and these are embraced by the inturned edges 44 of a connecting strip 45 slidable longitudinally onto these flanges to hold together the edges of the sides 41 opposite to the connecting wall 42. The lower edges of the side members may be provided with outwardly extending flanges 41' for supporting the device on a supporting surface. The central portions of the side walls 41 are cupped or depressed inwardly at 46 to provide walls 47 forming a central support for the coil or roll 48 of the adhesive tape. At the lower edge of the connecting wall 42 is an extension 49 bent outwardly and preferably inclined upwardly somewhat and terminating at its free edge in a knife edge 50. This extension corresponds to the extension 23 and knife edge 24 of the forms of Figs. 1 to 6, and the free end portion of the coil of tape 48 is drawn out on the under side of this extension as shown at 51, and associated with this extension is a finger grip and protector 52 corresponding to the grip and protector 25 of the first form. This grip and protector comprises a base portion 53 lying on the under side of the extension 49 and the free end of the tape 51, and at its outer edge is bent backwardly to form a top portion 54 corresponding to the top portion 29 of the first form, to lie on the top of the extension 49 with the knife edge in the loop 55 connecting the two portions 53 and 54. In this position it covers and protects the knife edge 55 and holds the free end 51 of the tape against the under side of the extension 49 and the under adhesive surface of this portion of tape adheres to the top surface of the base portion 53 to retain the elements in the position of Fig. 8 preparatory for use, the same as in the first forms. In withdrawing a strip of tape for use, the operation is the same as in the first form in that the operator holds the member 41 in one hand and then gripping the member 52 draws it outwardly, unwinding a strip of tape from the coil 48, as indicated in dotted lines. After the desired length has been drawn outwardly, it is torn off against the knife edge 55, and then the tape is applied as described in connection with Fig. 9, and the grip and protector 52 returned to the position of Fig. 8 with the base portion 53 on the under and adhesive coated side of the free end portion 51 of the tape lying on the under side of the extension 49.

In Fig. 10 a strip or blank of sheet metal is shown at 56, and from this may be blanked T-shaped members 57, the arms or cross bars forming the side members 17 and 37 of the U-shaped members of Figs. 1 to 6, and the central portion forming the extensions 23 for the knife edge.

It will be clear from the above that in the normal position with the grip and protector 25 or 52 in the positions of Figs. 1, 4 and 8, the free end of the tape adheres to the top surface of the base portion 26 or 53 of this grip, and that this adhesive covered surface is fully protected against drying out or collection of dirt and dust; that in removing a strip of this tape it is drawn off from the coil by means of the grip and protector 25 or 52, and this is the portion held between the fingers of the operator and therefore it is not necessary for the operator to grip the tape with the fingers. Therefore the fingers do not at any time come in contact with the adhesive surface to mar it in any way or soil the fingers. The grip or protector 52 also functions as an applicator to apply the removed strip to the surfaces of the article or articles to be taped, as indicated in Fig. 9. This device has numerous advantages in that none, or very little, of the adhesive surface of the tape is exposed to the air to dry out; it is not necessary for the operator to grip the free ends in the fingers so that it would stick to them or would mar the adhesive surface in any way, such, for example, as reducing its sticking value, or in the case of transparent tape causing finger marks which would decrease or dull the transparency of the tape; it also saves material as the strips can be withdrawn accurately to length and torn off to very short or any lengths desired.

The device is very simple in construction, involving a minimum number of parts; it enables easy pulling of a strip of tape from the coil, and the grip of the sides of the members 16 or 34 acting against the sides of the coil when gripped by the operator acts as a sort of brake in the unwinding operation to control the speed of turning of the coil. A very important feature is that the grip and protector 25 or 52 when in position prior to use covers and protects the knife edge so that there is no danger of injury to anyone handling the device, and it is always ready for the next operation of removing a strip of tape for use, by merely gripping this element and pulling it outwardly.

Having thus set forth the nature of my invention, I claim:

1. A device for dispensing adhesive tape having a pressure sensitive coating comprising a support for a coil of the tape, a cut-off device comprising a member having a cross portion passing over and across the outer edge of the coil and a side member for pivotally securing it to the coil support, an extension projecting from one edge of the cross portion over the outer periphery of the coil and provided with a knife edge at its free end, and a finger grip and protector comprising a base portion to lie under said extension and the free end of the tape when on the under side of the extension with this free end adhering to said grip, and the grip also including a backwardly extending top portion lying over the top of the extension and providing with the base portion a closed space to enclose the knife edge.

2. A device for dispensing adhesive tape having an adhesive coated surface, comprising a support including side members to be located on opposite sides of a coil of the tape and a connecting transverse member to extend across the outer edge of the coil, said side members forming means for so connecting the support with the coil as to permit rotation of the coil to permit pulling off a given length of the tape, an extension at one edge of the transverse member to lie adjacent and over the periphery of the coil and provided with a cut-off knife edge at its free end, and a hand grip comprising a strip of material bent upon itself to form a base and top portions connected by a loop and forming a recess between them, said grip being located on the extension with the knife edge enclosed in the space between the base and top portions of the grip with a space between the under side of the extension and the base portion of the grip for the free end portion of the coil of tape.

3. A protector and cut-off for adhesive tape comprising a support including side members for holding a coil of tape for rotation in the support and a transverse member between the side members to extend across the edge of the coil, said transverse member provided with a knife edge at one edge, and a finger grip and protector for the free end of the tape including connected upper and lower portions to lie at the upper and lower sides of the transverse member respectively with the knife edge embraced between them, and the lower portion of the grip providing means to which the free end portion of the tape located at the under side of the cross member may be secured by the adhesive on this free end portion.

4. A protector and cut-off for adhesive tape comprising a support including side members for holding a coil of tape for rotation in the support and a transverse member between the side members to extend across the edge of the coil, said transverse member provided with a knife edge at one edge, and a finger grip and protector for the free end portion of the tape including a base portion to lie at the under side of the transverse member and provide means to which the free end portion of the tape may be secured by the adhesive on this free end portion, and said finger grip including means for retaining it on the transverse member.

5. A protector and cut-off for adhesive tape comprising a substantially U-shaped member including spaced side legs and a transverse connecting member between them, said side legs including means for securing them at the sides of a coil of tape to permit rotation of the coil in the support with the transverse member extending across the edge of the coil, said transverse member provided with a knife edge at one edge, and a finger grip and protector for the free end of the tape including connected upper and lower portions to lie at the upper and lower sides of the transverse member respectively with the knife edge embraced between them, and the lower portion of the grip providing means to which the free end portion of the tape located at the under side of the cross member may be secured by the adhesive on this free end portion.

6. A protector and cut-off for adhesive tape comprising a substantially U-shaped member including spaced side legs and a transverse connecting member between them, said side legs including means for securing them at the sides of a coil of tape to permit rotation of the coil in the support with the transverse member extending across the edge of the coil, said transverse member provided with a knife edge at one edge, and a finger grip and protector for the free end portion of the tape including a base portion to lie at the under side of the transverse member and provide means to which the free end portion of the tape may be secured by the adhesive on this free end portion, and said finger grip including means for retaining it on the transverse member.

7. A protector and cut-off for adhesive tape comprising a support including side members for location on opposite sides of a coil of tape rotatable in the support, said support including a transverse member to extend across the edge of the coil and provided with a knife edge, and a finger grip and protector for the free end portion of the tape including a base portion to which the free end portion may be secured by the adhesive on this end portion, and said grip including means for supporting it on the transverse member with its base portion at one side of the transverse member.

References Cited in the file of this patent

UNITED STATES PATENTS

| Number | Name | Date |
| --- | --- | --- |
| 423,228 | Ellerman | Mar. 11, 1890 |
| 2,119,537 | Halpin | June 7, 1938 |
| 2,574,175 | Erhardt | Nov. 6, 1951 |